US008971522B2

(12) United States Patent
de Vicente Peña et al.

(10) Patent No.: US 8,971,522 B2
(45) Date of Patent: Mar. 3, 2015

(54) NOISE REDUCTION

(71) Applicant: Microsoft Corporation, Redmond, WA (US)

(72) Inventors: Jesus de Vicente Peña, Skarpnack (SE); Per Ahgren, Knivsta (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/013,919

(22) Filed: Aug. 29, 2013

(65) Prior Publication Data

US 2014/0334631 A1 Nov. 13, 2014

(30) Foreign Application Priority Data

May 8, 2013 (GB) .................................. 1308247.4

(51) Int. Cl.
*H04M 9/08* (2006.01)
*G10K 11/16* (2006.01)

(52) U.S. Cl.
CPC ....................................... *G10K 11/16* (2013.01)
USPC ............ 379/406.07; 379/390.01; 379/390.03; 379/395

(58) Field of Classification Search
USPC ................... 379/406.07, 390.01, 390.03, 395
See application file for complete search history.

(56) References Cited

U.S. PATENT DOCUMENTS 6,148,078 A * 11/2000 Romesburg ............. 379/406.07
8,019,104 B2 * 9/2011 Klinkby et al. ............... 381/317
8,311,234 B2 11/2012 Sakuraba
2006/0210091 A1 9/2006 Okumura
2007/0116254 A1 * 5/2007 Looney et al. ........... 379/406.01
2008/0310659 A1 12/2008 Kim et al.
2011/0110532 A1 5/2011 Svendsen
2011/0182439 A1 7/2011 Sakurada et al.
2012/0207327 A1 * 8/2012 Sorensen et al. ............. 381/94.3
2012/0295562 A1 * 11/2012 Sorensen et al. ........... 455/127.2

FOREIGN PATENT DOCUMENTS

WO WO 2010106469 9/2010

OTHER PUBLICATIONS

Pandey, et al., "Howling Suppression in Hearing Aids using Least-Squares Estimation and Perceptually Motivated Gain Control", In IEEE International Conference on Acoustics, Speech and Signal Processing, vol. 5, May 14, 2006, pp. 4.
"International Search Report and Written Opinion", Application No. PCT/US2014/037041, Sep. 26, 2014, 9 Pages.

* cited by examiner

*Primary Examiner* — Alexander Jamal
(74) *Attorney, Agent, or Firm* — Sonia Cooper; Jim Ross; Micky Minhas

(57) ABSTRACT

A method of reducing noise in an acoustic system, the method comprising at a first user terminal: receiving an audio signal from at least one further user terminal over a network; executing a communication client on a processing unit, the client configured so as when executed to: supply the audio signal to an audio signal processing module of the first user terminal, wherein the processing module processes the audio signal, whereby a level of gain is applied to the audio signal, and outputs a processed audio signal to a speaker; estimate a noise level of the audio signal and the processed audio signal and estimate the gain applied by the processing module taking into account both the noise level estimates; selectively apply a system gain reduction step to at least one of the audio signal and an audio signal received via a microphone, based on at least the estimated gain.

20 Claims, 5 Drawing Sheets

NOISE REDUCTION

RELATED APPLICATION

This application claims priority under 35 USC 119 or 365 to Great Britain Application No. 1308247.4 filed May 8, 2013, the disclosure of which is incorporate in its entirety.

BACKGROUND

Communication systems allow users to communicate with each other over a network. The network may be, for example, the Internet or public switched telephone network (PSTN). Audio signals can be transmitted between nodes of the network, to thereby allow users to transmit and receive audio data (such as speech data) to each other in a communication session over the communication system.

A user device may have audio input means such as a microphone that can be used to receive audio signals such as speech from a user. The user may enter into a communication session with another user, such as a private call (with just two users in the call) or a conference call (with more than two users in the call). The user's speech is received at the microphone, processed and is then transmitted over a network to the other users in the call. The user device may also have audio output means such as speakers for outputting audio signals to nearend user that are received over the network from a farend user during a call. Such speakers can also be used to output audio signals from other applications which are executed at the user device, and which can be picked up by the microphone as unwanted audio signals which would disturb the speech signals from the nearend user.

As well as the audio signals from the user, the microphone may also receive other audio signals, such as background noise, which are unwanted and which may disturb the audio signals received from the user. The background noise can contribute to disturbance to the audio signal received at the microphone from the nearend user for transmission in the call to a farend user. Another difficulty that can arise in an acoustic system is "howling". Howling is an unwanted effect which arises from acoustic feedback in the system. It can be caused by a number of factors and arises when system gain is high.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of reducing noise in an acoustic system comprising a first user terminal and at least one further user terminal. The first user terminal receives an audio signal from the at least one further user terminal over a communications network. The first user terminal comprises a processing unit on which is executed a communication client application. The communication client application is configured so as when executed on the processing unit to supply the audio signal to an audio signal processing module of the first user terminal, wherein the audio signal processing module processes the audio signal, whereby a level of gain is applied to the audio signal, and outputs a processed audio signal to audio output means of the first user terminal. The communication client application is configured so as when executed on the processing unit to estimate a noise level of the audio signal and the processed audio signal and estimate the gain applied by the audio signal processing module based on a ratio of the noise level estimates. The communication client application is also configured so as when executed on the processing unit to selectively apply a system gain reduction step to at least one of the audio signal and a near-end audio signal received via audio input means of the first user terminal, based on at least the estimated gain applied by the audio signal processing module.

The method may be used in a call (e.g. a call implementing voice over internet protocol (VoIP) to transmit audio data between user devices) in which case the audio signal may be a far-end signal received from the far-end of the call, and the received signal includes the resulting echo and a near-end signal for transmission to the far-end of the call.

BRIEF DESCRIPTION OF THE DRAWINGS

For a better understanding of the described embodiments and to show how the same may be put into effect, reference will now be made, by way of example, to the following drawings in which.

DETAILED DESCRIPTION

Embodiments will now be described by way of example only.

Figure 1A:
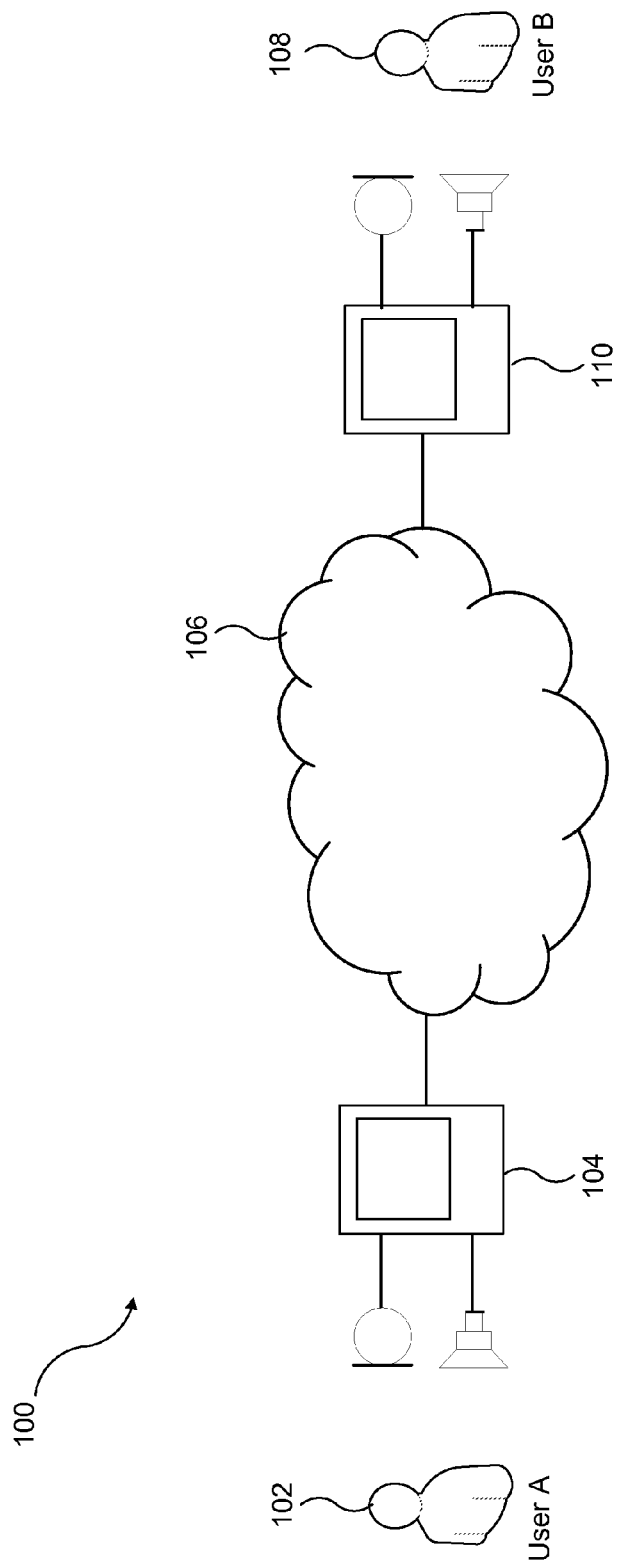
FIG. 1a shows a schematic illustration of a communication system.

FIG. 1a shows a communication system 100 comprising a first user 102 ("User A") who is associated with a first user device 104 and a second user 108 ("User B") who is associated with a second user device 110. In other embodiments the communication system 100 may comprise any number of users and associated user devices. The user devices 104 and 110 can communicate over the network 106 in the communication system 100, thereby allowing the users 102 and 108 to communicate with each other over the network 106. The communication system 100 shown in FIG. 1 is a packet-based communication system, but other types of communication system could be used. The network 106 may, for example, be the Internet. Each of the user devices 104 and 110 may be, for example, a mobile phone, a tablet, a laptop, a personal computer ("PC") (including, for example, Windows™, Mac OS™ and Linux™ PCs), a gaming device, a television, a personal digital assistant ("PDA") or other embedded device able to connect to the network 106. The user device 104 is arranged to receive information from and output information to the user 108 of the user device 110. The user device 104 comprises output means such as a display and speakers. The user device 104 also comprises input means such as a keypad, a touch-screen, a microphone for receiving audio signals and/or a camera for capturing images of a video signal. The user device 104 is connected to the network 106.

The user device 104 executes an instance of a communication client, provided by a software provider associated with the communication system 100. The communication client is a software program executed on a local processor in the user device 104. The client performs the processing required at the user device 104 in order for the user device 104 to transmit and receive data over the communication system 100.

The user device 110 corresponds to the user device 104 and executes, on a local processor, a communication client which corresponds to the communication client executed at the user device 104. The client at the user device 110 performs the processing required to allow the user 108 to communicate over the network 106 in the same way that the client at the user device 104 performs the processing required to allow the user 102 to communicate over the network 106. The user devices 104 and 110 are endpoints in the communication system 100. FIG. 1 shows only two users (102 and 108) and two user devices (104 and 110) for clarity, but many more users and user devices may be included in the communication system 100, and may communicate over the communication system 100 using respective communication clients executed on the respective user devices.

Both the first user device 104 and a second user device 110 may perform acoustic echo cancellation. There are two main ways to achieve acoustic echo cancellation, one being echo subtraction and the other being echo suppression. Often these two approaches are combined.

One of the challenges in echo cancellation systems is to reduce howling. Howling is a symptom of having feedback with a system gain higher than 1 somewhere in the frequency spectrum. By reducing the system gain at this frequency, the howling will stop. A typical scenario where the risk of howling is high is during a call between hands-free devices. Under such a scenario, the system gain (the sum of all the gains in the closed-loop communication setup) can be higher than unity and therefore a signal that is being passed through the echo cancellers may circulate the system and at each loop be amplified.

The howling problem is more relevant for echo cancellation systems based on suppression than for echo cancellation systems based on subtraction. Even so, if an echo cancellation system based on subtraction does not manage to remove all the echo it can also suffer from howling.

The audio signal captured by the microphone of the first user device 104 is transmitted over the network 106 for playing out by the second user device 110. The microphone of the second user device 110 captures an echo of the audio signal that was transmitted by the first user device 104, if that echo is not fully cancelled, then the second user device 110 transmits it back to the first user device 104. That received signal is played-out through the speakers of the first user device 104 and, an echo is captured by the microphone of the first user device 104. If the echo canceller in the first user device 104 is not able to completely remove that echo, the echo signal is transmitted again to the second user device 110. If during that loop, any frequency content of the original audio signal has suffered a gain higher than one, a howling condition will occur. The term system gain used herein refers to the gain that is applied to an audio signal during this loop i.e. the combination of the gain at first user device 104 and the gain at the second user device 110.

Devices typically have a dedicated audio signal processing module (such as a sound card) in addition to a local processor on the device. This audio signal processing module performs audio processing functions for the user device such as analogue to digital conversion (ADC) of audio signals captured at a microphone and digital to analogue conversion (DAC) of audio signals for playing out of a speaker. To use the audio signal processing module an operating system (OS) executed on the local processor on the device typically requires specific software. For example, to use a sound card, an OS typically requires a specific sound card driver (a software program that handles the data connections between the physical hardware of the sound card and the operating system).

It is common that this software (i.e. sound card drivers) introduce effects on the play out signal (i.e. the signal to be output from a speaker) in order to maximize the user experience (e.g. loudness enhancement effects included in the drivers). Those effects are achieved by signal processing modules on the audio signal processing module the functionality of which is unknown to the applications (i.e. a communication client) executed on a local processor on the device that use the play out system available in the OS. However, some operating systems include functionality for feeding back the signal that is going to be played out, to the application executed on the local processor. Examples of operating systems including this functionality are Microsoft's Windows 7, 8, XP and Vista Windows Phone 8 operating systems. This signal that is fed back to the application executed on the local processor is referred to herein after as a "loopback signal".

The use of such a dedicated audio signal processing module in combination with an echo cancellation system introduces certain problems. Specifically, the dedicated audio signal processing module changes the gain that is applied to an audio signal that is output by an application executed on the local processor before it is played out at a speaker. This change in gain is unknown to the application executed on the local processor and thus may affect the system gain and increase the risk that the echo canceller enters into a howling condition.

Figure 1B:
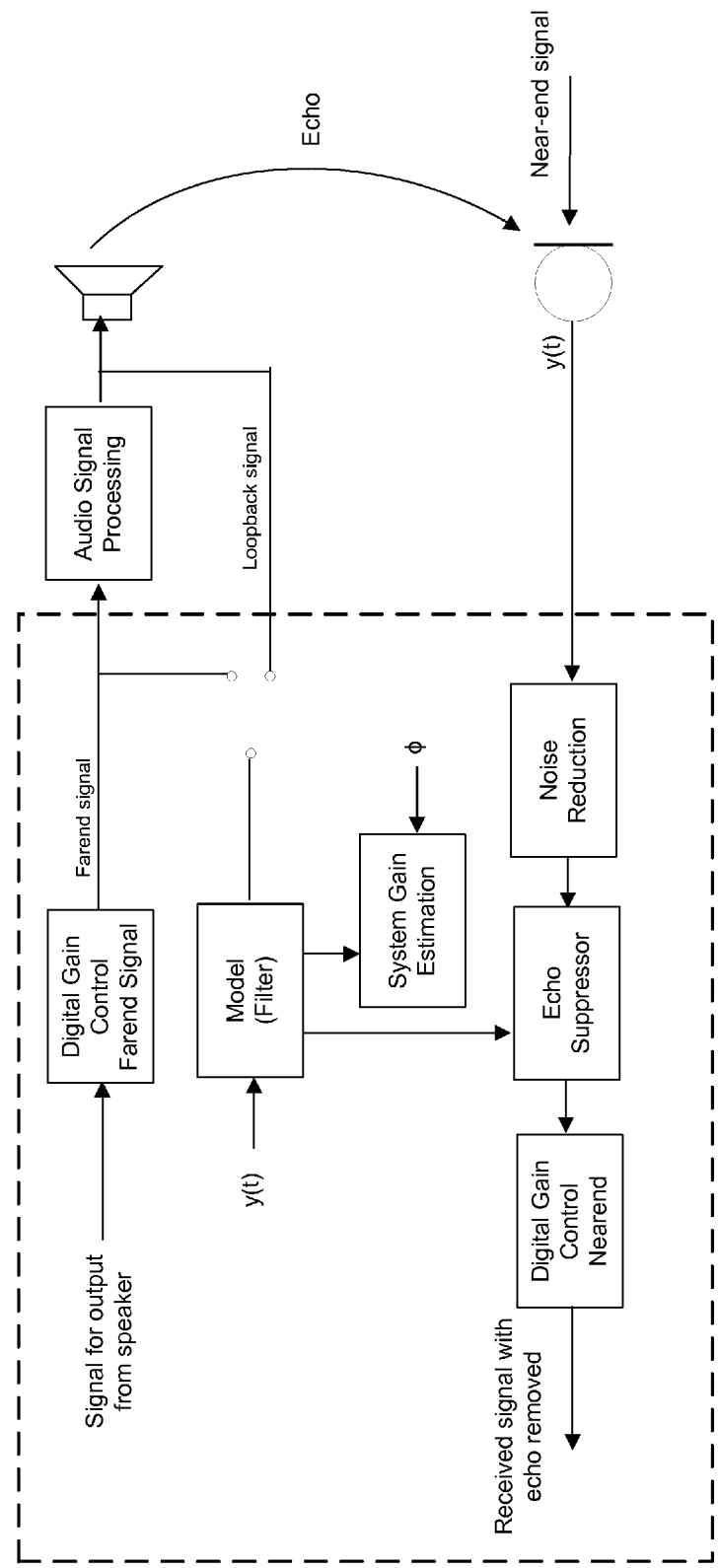
FIG. 1b is a schematic function diagram of a gain estimation technique.

Reference is now made to FIG. 1b shows a simplified scheme of a user device in a communication system where an audio signal is processed by dedicated audio signal processing hardware before it is played out at a speaker signal.

In order to avoid howling, the system gains in the closed-loop communication setup needs to be tracked and kept below one. In order to do that, a user device estimates the gain that is introduced by signal processing functionality implemented at the user device on a local processor. The signal processing functionality implemented by executing a communication client on the local processor of a device is shown contained in the dashed box in FIG. 1b. As shown in FIG. 1b, signal processing functionality implemented by executing a communication client on the local processor of a device may include digital gain control, echo suppression and noise reduction. Each signal processing component introduces gain which contributes to the total system gain. The gain introduced by each signal processing component is represented by $\phi$ and used for system gain estimation. The system gain estimation also takes into account echo path gains modelled using the received audio signal y(t) and a reference signal.

To model the echo path gains and estimate the echo captured by a microphone, a reference signal is needed. With reference to FIG. 1b (where the OS includes functionality for feeding back the signal that is going to be played out, to a communication client executed on the user device) it can be seen that two possible signals can be considered as reference signals.

The first signal that can be considered a reference signal is the signal labelled as "far-end signal". This signal represents the audio signal that a communication client sends for playing out from a speaker. Using the far-end signal as a reference has the advantage that any processing performed by the audio signal processing module is taken into account when the echo path is estimated. However, as the processing that is implemented by the audio signal processing module is often highly nonlinear and signal dependent it is extremely difficult to get good estimates for the echo paths that are valid.

The second signal that can be considered a reference signal is the signal labelled as "loopback signal". As described above, this is the signal that the OS feedbacks to the communication client and that has been affected by the processing that the audio signal processing module applies to the signal before playing it out from a speaker. Using the loopback signal as the reference signal avoids the problem of forcing the echo path estimation to attempt estimating the processing done by the audio signal processing module. The drawback is however, that the signal has often been modified in a nonlinear manner such that low-level (i.e. low amplitude) signals are boosted more than high-level (i.e. high amplitude) signals, making it extremely difficult to use this signal for estimating the system gain.

In accordance with methods described herein the gain introduced by the audio signal processing module is estimated by using the noise levels of the far-end signal before and after processing. This information is used by the echo cancellation system for ensuring that the system gain is below one, and therefore reduce the risk of howling.

By estimating the gain applied by the audio signal processing module for at least one frequency, a system gain reduction step may be selectively applied by the communication client at that frequency.

Although it is possible to obtain a reduction in howling by attenuating only one frequency which is likely to predispose the acoustic system to howling, it is particularly advantageous if a respective local gain or system gain of the acoustic system is calculated for each of a plurality of frequencies in the received signal. This is because a howling effect will be introduced into the acoustic system if any frequency component of an audio signal in the closed-loop communication setup has a system gain exceeding one.

In embodiments described herein, the gain applied by the audio signal processing module is estimated for each of a plurality of frequencies, and a system gain reduction step may be selectively applied by the communication client at each of the plurality of frequencies. Thus howling is avoided by ensuring the system gains for all frequency components of an audio signal in the closed-loop communication setup are tracked and kept below one.

Figure 2:
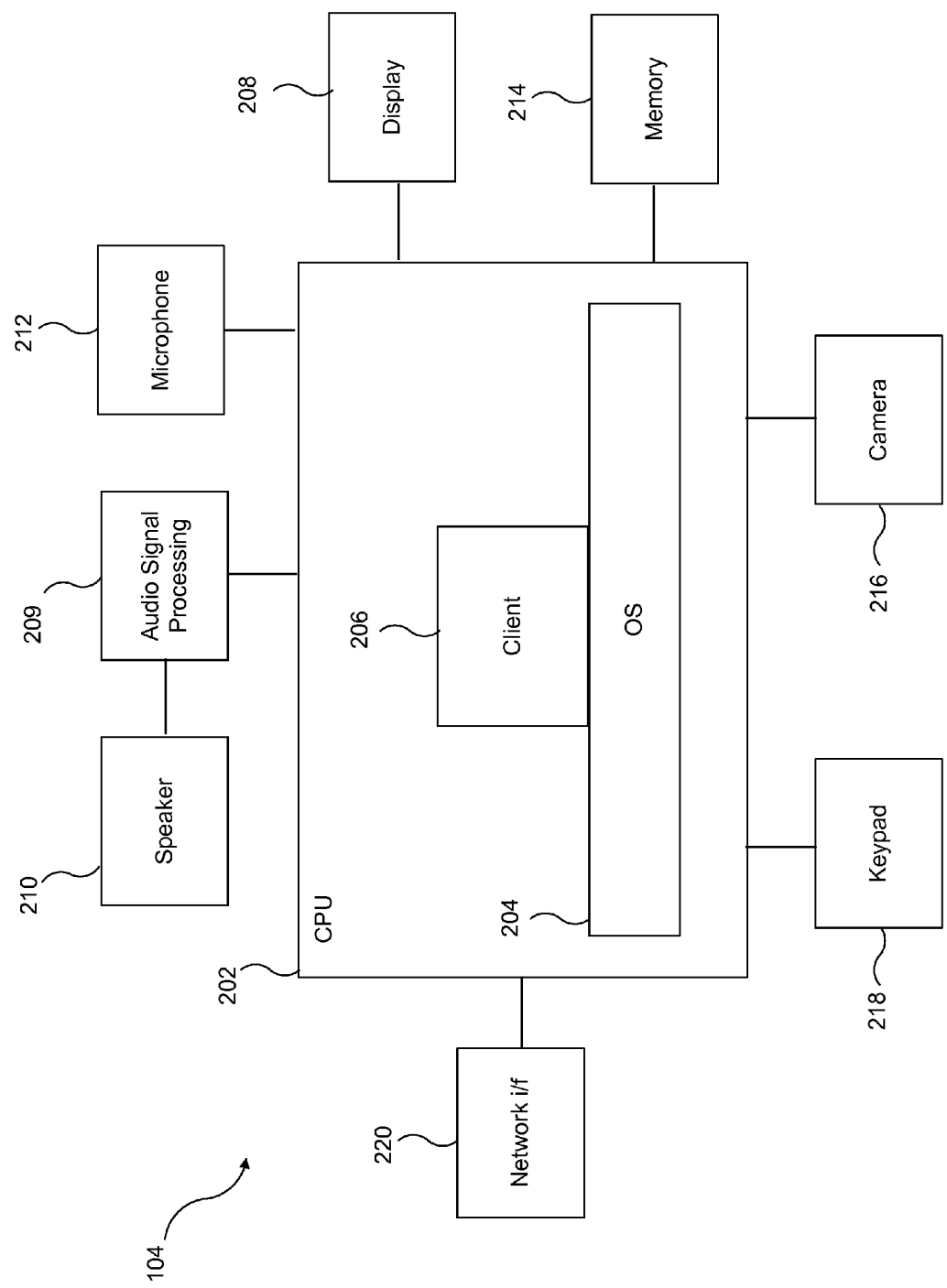
FIG. 2 is a schematic block diagram of a user device.

FIG. 2 illustrates a detailed view of the user device 104 on which is executed a communication client instance 206 for communicating over the communication system 100. The user device 104 comprises a central processing unit ("CPU") or "processing module" 202, to which is connected: output devices such as a display 208, which may be implemented as a touch-screen, and a speaker (or "loudspeaker") 210 for outputting audio signals; input devices such as a microphone 212 for receiving audio signals, a camera 216 for receiving image data, and a keypad 218; a memory 214 for storing data; and a network interface 220 such as a modem for communication with the network 106. The user device 104 may comprise other elements than those shown in FIG. 2. The display 208, speaker 210, microphone 212, memory 214, camera 216, keypad 218 and network interface 220 may be integrated into the user device 104 as shown in FIG. 2. In alternative user devices one or more of the display 208, speaker 210, microphone 212, memory 214, camera 216, keypad 218 and network interface 220 may not be integrated into the user device 104 and may be connected to the CPU 202 via respective interfaces. One example of such an interface is a USB interface. If the connection of the user device 104 to the network 106 via the network interface 220 is a wireless connection then the network interface 220 may include an antenna for wirelessly transmitting signals to the network 106 and wirelessly receiving signals from the network 106.

FIG. 2 also illustrates an operating system ("OS") 204 executed on the CPU 202. Running on top of the OS 204 is the software of the client instance 206 of the communication system 100. The operating system 204 manages the hardware resources of the computer and handles data being transmitted to and from the network 106 via the network interface 220. The client 206 communicates with the operating system 204 and manages the connections over the communication system. The client 206 has a client user interface which is used to present information to the user 102 and to receive information from the user 102. In this way, the client 206 performs the processing required to allow the user 102 to communicate over the communication system 100.

Figure 3:
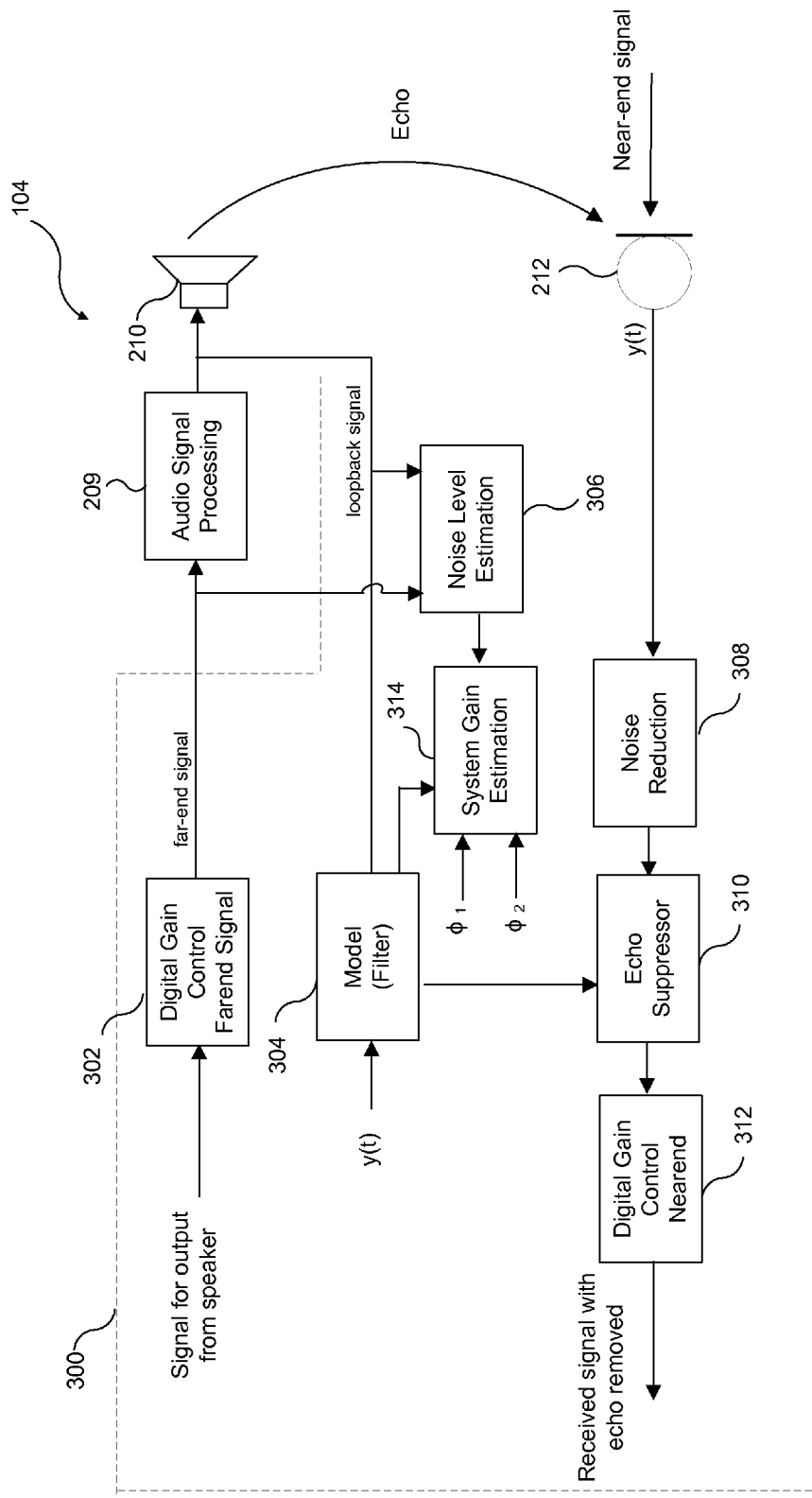
FIG. 3 is a schematic function diagram of a gain estimation technique.
Figure 4:
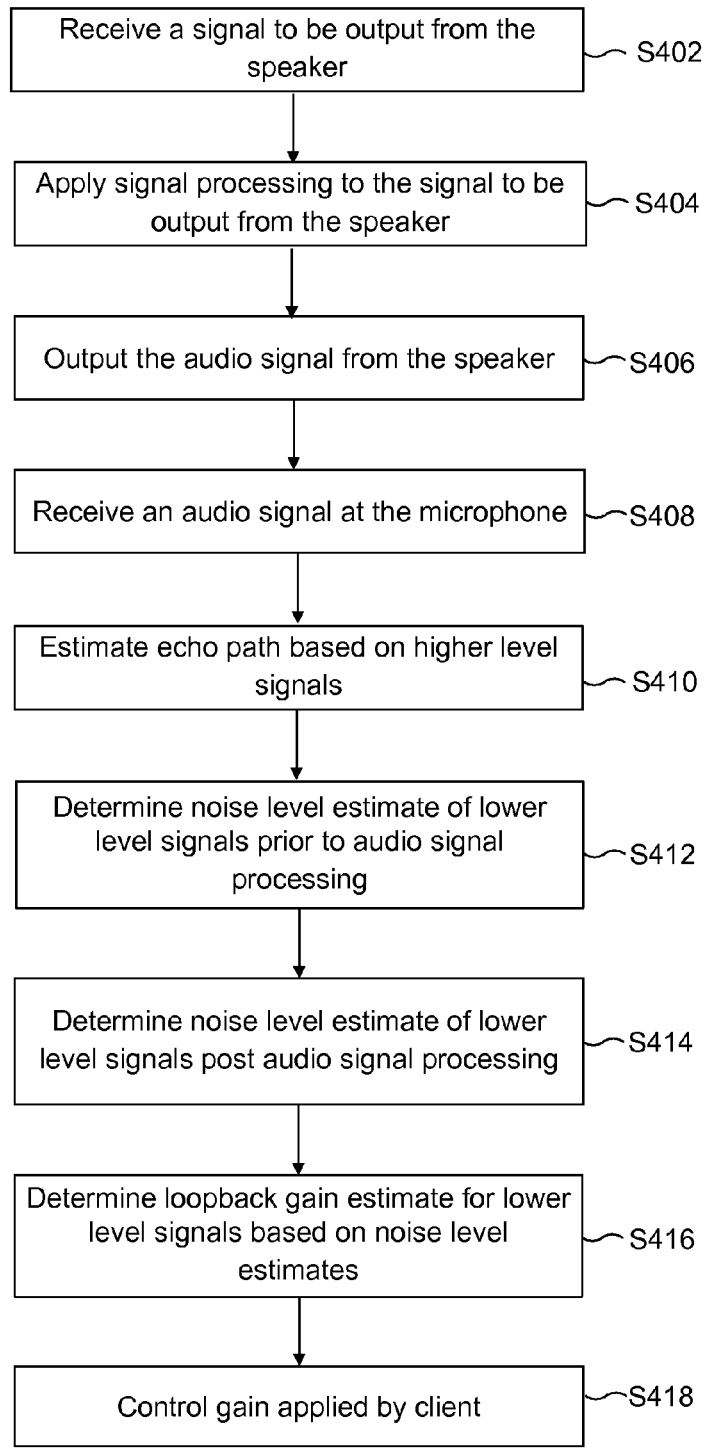
FIG. 4 is a flow chart for a process of selectively applying system gain reduction.

With reference to FIGS. 3 and 4 there is now described a method of selectively applying system gain reduction. FIG. 3 is a functional diagram of a part of the user device 104 showing how a system gain reduction process is implemented.

As shown in FIG. 3, the user device 104 comprises the speaker 210, the microphone 212, and a signal processing module 300. The signal processing module 300 (shown as the dashed box in FIG. 3) represents the signal processing functionality implemented by executing communication client application 206 on the CPU 202 of device 104. The signal processing module 300 may comprise digital gain modules module 302/312, a modelling module 304 comprising a filter module, a noise level estimation module 306, a noise reduction module 308, an echo suppression module 310 and a system gain estimation module 314. The signal processing functionality implemented by executing communication client application 206 may include more, or less functionality, than that shown in FIG. 3. The user device 104 further comprises an audio signal processing module 209.

FIG. 4 is a flow chart for the process of selectively applying system gain reduction.

A signal to be output from the speaker 210 is coupled to an input of the digital gain module 302. An output of the digital gain module 302 (denoted "far-end signal") is coupled to an input of the audio signal processing module 209. An output of the audio signal processing module 209 is coupled to the speaker 210. It should be noted that in the embodiments described herein there is just one speaker (indicated by reference numeral 210 in the figures) but in other embodiments there may be more than one speaker to which the signal to be outputted is coupled (for outputting therefrom). Similarly, in the embodiments described herein there is just one microphone (indicated by reference numeral 212 in the figures) but in other embodiments there may be more than one microphone which receives audio signals from the surrounding environment. The output of the audio signal processing module 209 is also coupled to a first input of the modelling module 304 and to a first input of the noise level estimation module 306. The output of the digital gain module 302 is coupled to a second input of the noise level estimation module 306. An output of the microphone 212 is coupled to the signal processing module 300. In particular, the output of the microphone 212 is coupled to an input of the noise reduction module 308. The output of the microphone 212 is also coupled to a second input of the modelling module 304. An output of the modelling module 304 is coupled to a first input of the system gain estimation module 314. An output of the noise level estimation module 306 is coupled to a second input of the system gain estimation module 314. An output of the modelling module 304 is coupled to a first input of the echo suppression module 310. An output of the noise reduction module 308 is coupled to a second input of the echo suppression module 310. An output of the echo suppression module 310 is coupled to an input of the gain control module 312. An output of the gain control module 312 is used to provide the received signal (with echo cancellation having been applied) for further processing in the user device 104.

In step S402 a signal is received which is to be outputted from the speaker 210. For example, the signal to be outputted may be a far-end signal that has been received at the user device 104 at network interface 220 from the user device 110 during a call between the users 102 and 108 over the communication system 100. In other embodiments, the signal to be outputted may be received from somewhere other than over the communication system 100 in a call. For example, the signal to be outputted may have been stored in the memory 214 and step S402 may comprise retrieving the signal from the memory 214.

Digital gain module 302 may apply a level of gain to the far-end signal before the far-end signal is supplied to audio signal processing module 209.

In step S404, the far-end signal is processed by the audio signal processing module 209. That is, the audio signal processing module 209 performs digital to analogue conversion (DAC) of the far-end signal and processes the far-end signal in accordance with effects introduced by software executed on CPU 204 before outputting the processed audio signal to speaker 210. The processing that is applied by the audio signal processing module 209 may be time variant and may be different for speech regions to noisy regions of the far-end signal. The processing that is implemented by the audio signal processing module 209 may include compression whereby different gains are applied to the far-end signal depending on the input level of the far-end signal.

In step S406 the audio signal that has been processed by the audio signal processing module 209 is outputted from the speaker 210. In this way the audio signal that has been processed by the audio signal processing module 209 is outputted to the user 102.

In step S408 the microphone 212 receives an audio signal. As shown in FIG. 3 the received audio signal may include a near-end signal which is a desired signal or "primary signal". The near-end signal is the signal that the user 102 intends the microphone 212 to receive. However, the received audio signal also includes an echo signal resulting from the audio signals outputted from the speaker 210 in step S406. The received audio signal may also include noise, such as background noise. Therefore, the total received audio signal y(t) can be given by the sum of the near-end signal, the echo and the noise. The echo and the noise act as interference for the near-end signal. Although not shown in FIG. 3, analogue to digital (ADC) conversion is applied to the signal captured by the microphone 212 to arrive at the digital signal y(t).

The modelling module 304 takes as inputs the outputted audio signal (denoted "loopback signal") and the received audio signal y(t). In step S410, the modelling module 304 is used to model the echo path of the echo in the received audio signal y(t).

The echo path describes the effects of the acoustic paths travelled by the audio signals output from the speaker 210 to the microphone 212. The audio signal may travel directly from the speaker 210 to the microphone 212, or it may be reflected from various surfaces in the environment of the nearend terminal. The echo path traversed by the audio signal output from the speaker 210 may be regarded as a system having a frequency and a phase response which may vary over time.

In order to remove the acoustic echo s(t) from the signal y(t) recorded at the near-end microphone 212 it is necessary to estimate how the echo path changes the desired far-end speaker output signal to an undesired echo component in the input signal.

The echo path h(t) describes how the echo in the received audio signal y(t) relates to the loopback signal x(t) output from the speaker 201, e.g. for a linear echo path represented by the impulse response h(t) or its counterpart in the frequency domain H($\omega$), the following equation describes the relation between the echo and the loopback signal: $S(\omega)=H(\omega)X(\omega)$ where $S(\omega)$ refers to the frequency response of the echo signal, s(t), and $X(\omega)$ refers to the frequency response of the loopback signal, x(t). The echo path might also vary over time and, therefore, different frequency responses, H($\omega$), can be found at different time instances. The echo path h(t), or its counterpart H($\omega$), may depend upon (i) the current environmental conditions surrounding the speaker 210 and the microphone 212 (e.g. whether there are any physical obstructions to the passage of the audio signal from the speaker 210 to the microphone 212, the air pressure, temperature, wind, etc), (ii) characteristics of the speaker 210 and/or the microphone 212 which may alter the signal as it is outputted and/or received, and (iii) any other process of the signal that might not be reflected in the loopback signal, e.g., buffer delays.

The filter module 304 models the echo path h(t) of the echo path in the received audio signal y(t). This is typically done by either making an estimation of the filter in the time domain or in the frequency domain. Using that estimate and the current loopback signal, it is possible to estimate the parameters that will be used by the echo canceller. Those parameters could be, for example, the suppression gains that are applied to the near-end spectrum in order to remove the echo (echo cancellers based on suppression) or the filter parameters that produce the echo estimate that needs to be subtracted from the near-end signal in order to remove the echo (echo cancellers based on subtraction). The current embodiment is specially tailored for echo canceller based on suppression, however, it is also possible to use it in echo cancellers based on subtraction given that the frequency gain introduced by the echo subtractor can be estimated.

In either case, echo cancellers based on suppression, subtraction or an hybrid version of both, the filter parameters that are modelled by the filter module 304 are better trained when the echo is the dominant part of the received audio signal, that is when $y(t) \cong s(t)$.

Estimation of the echo path is done during far-end activity, the far-end activity is detected by a Voice Activity Detector (VAD) (a component of the signal processing module 300 not shown in FIG. 3) which detects speech like qualities in the far-end signal. The estimation of the echo path is therefore mainly based on high energy signals as these are the signals that trigger the VAD. Typically, the VAD maintains a threshold, and the high energy signals are those with energy above the threshold amount above the background noise i.e. the threshold that determines whether the current frame has enough energy to trigger the VAD depends on the background noise present in the far-end signal. For the sake of using known terminology, we refer as VAD to the module that detects activity. However, it should be noted that this module is not limited to detect speech signals but any signal whose expected echo would be annoying if it passes through the echo canceller. As pointed out above, that module is often based on detecting signals with a higher energy than the background noise. The system gain estimation module 314 is arranged to receive the estimated echo path from the modelling module 304.

By identifying the gain introduced by the audio signal processing module 209 it is possible for the echo cancellation system to ensure that the system gain is below one, and therefore reducing the risk of howling. This process is now described.

As the signal processing that is applied to the far-end signal in the audio signal processing module 209 is usually time variant and level dependent, it is important to select the appropriate type of signals for estimating the contribution of the audio signal processing module 209 to the system gain. For howling reduction, it is the gain applied over low energy signals that are the most relevant as these are the signals that are typically amplified by the systems that suffer from howling. By low energy signals, we refer to the signals with an energy comparable to the background noise present in the far-end signal. Because the low energy signals have an energy comparable to the background noise level in the far-end signal, the VAD at the far-end is not triggered (the low energy signals are not detected as speech) and the echo suppressor is inactive during those regions.

The noise level estimation module 306 receives the far-end signal and the loopback signal as inputs. In step S412 the noise level estimation module 306 determines a noise level estimate ($NL_{Farend}(f)$) of the far-end signal (i.e. prior to signal processing by the external signalling processing module 209). In step S414 the noise level estimation module 306 determines a noise level estimate ($NL_{Loopback}(f)$) of the loopback signal (i.e. after the signal processing by the external signalling processing module 209). Possible techniques implemented by noise level estimation module 306 to determine noise level estimates $NL_{Farend}(f)$ and $NL_{Loopback}(f)$ are well known to persons skilled in the art and are therefore not discussed in detail herein.

In step S416 the noise level estimation module 306 estimates the loopback gain, LG(f), which is an estimate of the gain introduced by the audio signal processing module 209 taking into account the noise level estimates $NL_{Farend}(f)$ and $NL_{Loopback}(f)$. For example the noise level estimation module 306 may determine a ratio between the noise level estimates $NL_{Farend}(f)$ and $NL_{Loopback}(f)$ in order to estimate a value for the loopback gain, LG(f). That is:

$$LG(f) = \frac{NL_{Loopback}(f)}{NL_{Farend}(f)}$$

Thus, the estimation of the gain introduced by the audio signal processing module 209 is based on the ratio between the noise level estimates of the loopback signal and of the audio signal that the communication client sends for playing out at speaker 210.

Signal processing may be performed on a per frame basis. Frames can, for example, be between 5 and 20 milliseconds in length and be divided into spectral frequency bins, for example, between 64 and 256 bins per frame. Each bin contains information about a signal component at a certain frequency, or in a certain frequency band. Ideally, for speech, each frame of the far-end signal is processed in real time and the gain introduced by the audio signal processing module for each frequency bin is estimated to control the level of gain applied by the signal processing functionality for that frequency bin implemented by executing a communication client application A noise estimator typically estimates the noise from the periods of silence on the speech signal and, therefore, the noise level estimate $NL_{Farend}(f)$ represents the portions of the far-end signal that has lowest amplitude values which will have a high gain introduced by any compressor functionality in the audio signal processing module 209, and the noise level estimate $NL_{Loopback}(f)$ represents the portions of the loopback signal that have the lowest amplitude values and thus have had a high gain applied to them in any compressor functionality in the audio signal processing module 209.

In particular, the estimation of the loopback gain applied by the audio signal processing module 209 is implemented using portions of the far-end audio signal which have an energy that does not trigger the VAD i.e. that have an energy that does not exceed a threshold amount above the estimated noise level of the audio signal.

By identifying the gain introduced by the audio signal processing module 209 based on the ratio of these noise levels, the system gain, which can be used for controlling the howling reduction, may be tracked even during regions with no active far-end. Furthermore the audio signal processing module 209 may have a gain that is dependent on the signal level, by tracking the noise levels ratio, it is possible to estimate the gain that is applied to the low level signals, which is the gain that is more relevant for preventing howling conditions.

The noise level of the far-end signal is typically also used by echo suppression based echo cancellers in the VAD module in order to determine whether they should cancel the echo, or let through the noisy echo (cancelling all echoes consisting only of noise typically causes excessive fading). Hence it is of particular importance that the system gain, and in this case particularly the loopback gain, is correctly estimated for low level signals, as this noisy echo will typically by echo canceller design never be cancelled by the echo canceller.

Even though the noise level based loopback gain estimate is not a good estimate of the maximum loopback gain, it is nevertheless sufficient for ensuring that the system gain is correctly estimated for the noise, which in turn ensures that the noise does not result in howling. Should the actual gain applied by audio signal processing module 209 be higher for lower level audio signals, this is acceptable since the noise in these lower level audio signals will occur rarely as, otherwise, the noise estimator would change its estimate toward those low levels.

Furthermore, should the gain be higher for higher level audio signals this is also acceptable since the howling buildup for these signals levels will be handled by the echo suppressor 310. That is, high input level audio signals will be suppressed by echo suppressor 310, therefore the high input level audio signals will not be able to trigger howling. However, the echo suppressor 310 will not perform echo suppression on the low level input signals if they are not detected as speech and, therefore, it is this kind of signals that are more likely to introduce howling.

The noise level estimation module 306 may perform noise level estimation needed by other modules in the signal processing module 300, for example, in the VAD referred to above. Therefore the embodiments described herein have a low computational cost. Furthermore the levels of stationary noise are typically fairly straightforward and robust to estimate and thus the embodiments described herein are also robust.

The system gain estimation module 314 is arranged to receive the estimated value for the loopback gain LG(f), from the noise level estimation module 306.

In step S418 the system gain estimation module 314 is arranged to control the level of gain applied in the signal processing functionality implemented by executing communication client application 206.

In particular, the system gain estimation module 314 may be arranged to estimate the total gain introduced at the user device 104 side of the closed-loop communication setup. That is, the system gain estimation module 314 is arranged to the estimate the total gain introduced at the user device 104 based on the estimated echo path gains received from the modelling module 304, the value for the loopback gain, LG(f), received from the noise level estimation module 306 and a signal $\phi_1$. The signal $\phi_1$ represents the total gain that is introduced by signal processing functionality implemented at the user device 104 (for example the gains introduced by digital gain control blocks 302/312, noise reduction block 308, and echo suppression module 310). The total gain introduced at the user device 104 side of the closed-loop communication setup can be estimated by multiplying all gains that are applied at the user device 104 side of the closed-loop communication setup.

As described above, in order to avoid howling, the system gains in the closed-loop communication setup needs to be tracked and kept below one. By using the estimated echo path gains received from the modelling module 304, the value for the loopback gain, LG(f), received from the noise level estimation module 306 and the signal $\phi_1$, the system gain estimation module 314 is able to determine an estimate of the gain introduced at the user device 104 side of the closed-loop communication setup.

The estimate of the gain introduced at the user device 104 side of the closed-loop communication setup will vary with frequency.

The system gain estimation module 314 may be arranged to selectively control the gain applied at a signal processing module of user device 104 which contributes to the system gain based on the determined estimate of the gain introduced at the user device 104 side of the closed-loop communication setup in order to keep the system gain below one. That is, even without an indication of the gain introduced at the user device 110 side of the closed-loop communication setup, the determined estimate of the gain introduced at the user device 104 side of the closed-loop communication setup provides an indication as to the risk of a howling condition occurring.

The system gain estimation module 314 may estimate the gain introduced at the user device 104 side of the closed-loop communication setup and compare it to a predetermined threshold level and if it exceeds the predetermined threshold then the system gain estimation module 314 is able to determine that the risk of a howling condition occurring is high and control the gain applied at one or more signal processing modules of user device 104 which contributes to the system gain. This predetermined threshold level may for example be a value greater than or equal to 0.5.

The user device 104 may also receive via network interface 220 a signal $\phi_2$ providing an estimate of the gain introduced at the user device 110 side of the closed-loop communication setup transmitted over the communication network 106 from user device 110. The signal $\phi_2$ may be supplied to the system gain estimation module 314. By receiving the estimated echo path from the modelling module 304, the value for the loopback gain, LG(f), from the noise level estimation module 306 and the signals $\phi_1$ and $\phi_2$, the system gain estimation module 314 is able to determine an estimate of the system gain of the closed-loop communication setup. The system gain can be estimated by multiplying all gains that are applied in the system.

The estimate of the system gain of the closed-loop communication setup will vary with frequency.

The system gain estimation module 314 may estimate the system gain of the closed-loop communication setup and compare it to a predetermined threshold level and if it exceeds the predetermined threshold then the system gain estimation module 314 is able to control the gain applied at one or more signal processing modules of user device 104 which contributes to the system gain. This predetermined threshold level would ideally be equal to 1. However, it may be convenient to lower it in order to take into account potential inaccuracies on the estimation of each block gains.

The system gain estimation module 314 may control the amount of gain applied at the digital gain control module 302 based on its estimate of the gain introduced at the user device 104 side of the closed-loop communication setup or its estimate of the system gain of the closed-loop communication setup.

The system gain estimation module 314 may control the amount of gain applied at the noise reduction module 308 based on its estimate of the gain introduced at the user device 104 side of the closed-loop communication setup or its estimate of the system gain of the closed-loop communication setup.

The noise reduction module 308 is arranged to lower the noise level of the microphone signal y(t) without affecting the speech signal quality of the microphone signal y(t). Various noise reduction techniques are known to persons skilled in the art for the purpose of eliminating noise. Spectral subtraction is one of these methods to enhance speech in the presence of noise. Spectral subtraction, uses estimates of the noise spectrum and the noisy speech spectrum to form a signal-to-noise (SNR) based gain function which is multiplied with the input spectrum to suppress frequencies having a low SNR. Additionally, that gain is limited in order to avoid speech distortions when the noise is over suppress. The aim of this process is to obtain an audio signal which contains less noise than the original. The system gain estimation module 314 may control the amount of gain applied to the microphone signal y(t) in the spectral subtraction process based on its estimate of the gain introduced at the user device 104 side of the closed-loop communication setup or its estimate of the system gain of the closed-loop communication setup.

The system gain estimation module 314 may control the amount of gain applied at the echo suppression module 310 based on its estimate of the gain introduced at the user device 104 side of the closed-loop communication setup or its estimate of the system gain of the closed-loop communication setup.

A filter module in the modelling module 304 estimates, based on the loopback signal and the echo path, the contributions of the echo component to the near-end signal y(t). In one example implementation, the filter module in the modelling module 304 filters the loopback signal x(t) to generate an estimate of the echo component in the near-end signal y(t) in accordance with the estimate of the echo path.

The echo suppression module 310 is arranged to apply echo suppression to the time-frequency regions of the of the received audio signal y(t) that are dominated by echo. The purpose of the echo suppressor 310 is to suppress the loudspeaker echo present in the microphone signal, e.g. in a VoIP client, to a level sufficiently low for it not to be noticeable/disturbing in the presence of the near-end sounds (non-echo sounds) picked up by the microphone 212. Echo suppression methods are known in the art. Furthermore, the echo suppression method applied by the echo suppression module 310 may be implemented in different ways. As such, the exact details of the echo suppression method are therefore not described in detail herein.

The echo suppression module 310 is arranged to receive as input the estimate of the echo component in the near-end signal y(t) and the microphone signal y(t) following noise reduction implemented by noise reduction module 308. The echo suppression module 310 is arranged to determine the power of the estimated echo and the power of the microphone signal y(t)) following noise reduction. In the echo suppression module 310 the estimated echo power is used together with the determined power of the microphone signal y(t), and possible other measures, to form echo suppression gains G (t, f) for time t and frequency f. The possible other measures may include but are not limited to information about the accuracy of the filter, and information about nonlinearities. An echo suppression gain G (t, f) for time t and frequency f is the ratio of the power of the output signal to the power of the input signal of the echo suppression module 310. These echo suppression gains have the purpose of suppressing any echo s(t) in the microphone signal y(t) to such a level that they are not noticeable in the presence of the near-end signal in the microphone input.

The system gain estimation module 314 may control the level of the echo suppression gains based on its estimate of the gain introduced at the user device 104 side of the closed-loop communication setup or its estimate of the system gain of the closed-loop communication setup.

The echo suppression module 310 outputs the received signal, with the echo having been suppressed, for further processing at the digital gain control module 312

The system gain estimation module 314 may control the amount of gain applied at the digital gain control module 312 based on its estimate of the gain introduced at the user device 104 side of the closed-loop communication setup or its estimate of the system gain of the closed-loop communication setup.

The signal output from the digital gain control module 312 may be processed by the client 206 (e.g. encoded and packetized) and then transmitted over the network 106 to the user device 110 in a call between the users 102 and 108. Additionally or alternatively, the signal output from the digital gain control module 312 may be used for other purposes by the user device 104, e.g. the signal may be stored in the memory 214 or used as an input to an application which is executing at the user device 104.

In the embodiments described above, the echo removal is implemented in a VoIP system (e.g. the received audio signal may include speech of the user 102 for transmission to the user device 110 during a call between the users 102 and 108 over the communication system 100). However, the loopback gain estimation method described herein can be applied in any suitable system in which howling reduction is to be applied.

In the embodiments described above, the acoustic system 100 comprises just two user devices. However it will be appreciated that the howling reduction method based on loopback gain estimation described herein can be applied in acoustic systems comprising more than two user devices The methods described herein may be implemented by executing a computer program product (e.g. the client 206) at the user device 104. That is, a computer program product may be configured to reduce noise in an acoustic system comprising the user device 104 and at least one further user device wherein the computer program product is embodied on a computer-readable storage medium (e.g. stored in the memory 214) and configured so as when executed on the CPU 202 of the device 104 to perform the operations of any of the methods described herein.

Generally, any of the functions described herein (e.g. the functional modules shown in FIG. 3 and the functional steps shown in FIG. 4) can be implemented using software, firmware, hardware (e.g., fixed logic circuitry), or a combination of these implementations. The modules and steps shown separately in FIGS. 3 and 4 may or may not be implemented as separate modules or steps. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described herein are platform-independent, meaning that the techniques may be implemented on a variety of commercial computing platforms having a variety of processors. For example, the user devices may also include an entity (e.g. software) that causes hardware of the user devices to perform operations, e.g., processors functional blocks, and so on. For example, the user devices may include a computer-readable medium that may be configured to maintain instructions that cause the user devices, and more particularly the operating system and associated hardware of the user devices to perform operations. Thus, the instructions function to configure the operating system and associated hardware to perform the operations and in this way result in transformation of the operating system and associated hardware to perform functions. The instructions may be provided by the computer-readable medium to the user devices through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of reducing noise in an acoustic system comprising a first user terminal and at least one further user terminal, the method comprising, at the first user terminal:
 receiving an audio signal from the at least one further user terminal over a communications network;
 supplying the audio signal to an audio signal processing module associated with the first user terminal, the audio signal processing module configured to:
  process the audio signal whereby a level of gain is applied to the audio signal; and
  output a processed audio signal to an audio output mechanism associated with the first user terminal;
 estimating a noise level associated with the audio signal and a noise level associated with the processed audio signal, the estimating the noise level associated with the audio signal and the noise level associated with the processed audio signal comprising estimating the noise levels during one or more periods of silence of speech in the audio signal or processed audio signal;
 estimating a gain applied by the audio signal processing module based, at least in part, on both the noise level estimates; and
 selectively reducing a system gain to at least one of the audio signal and a near-end audio signal received via an audio input mechanism associated with the first user terminal, the selectively applying based, at least in part, on at least the estimated gain applied by the audio signal processing module.

2. A method according to claim 1, wherein the gain applied by the audio signal processing module is estimated for at least one frequency, and wherein reducing the system gain further comprises reducing a level of gain applied to at least one of the audio signal and the near-end audio signal at that frequency.

3. A method according to claim 1, wherein the gain applied by the audio signal processing module is estimated for each of a plurality of frequencies, and wherein reducing the system gain further comprises reducing a level of gain applied to at least one of the audio signal and the near-end audio signal at each of the plurality of frequencies.

4. A method according to claim 1, the method further comprising:
   estimating a first user terminal gain based, at least in part, on the estimated gain applied by the audio signal processing module; and
   controlling the applied level of gain to the audio signal based, at least in part, on said first user terminal gain.

5. A method according to claim 4, wherein the first user terminal gain is estimated from
   the estimated gain applied by the audio signal processing module;
   an echo path gain estimated at the first user terminal; and
   a gain in each of a plurality of processing stages associated with the audio signal.

6. A method according to claim 4, further comprising comparing the first user terminal gain to a threshold and reducing the system gain if it is determined that the first user terminal gain exceeds said threshold.

7. A method according to claim 1, the method further comprising:
   using the estimated gain applied by the audio signal processing module in estimating a system gain of the acoustic system; and
   controlling the level of gain applied to the audio signal based, at least in part, on said estimated system gain.

8. A method according to claim 7, wherein the first user terminal receives an indication of gain applied at the at least one further user terminal, and wherein the system gain is estimated from:
   the estimated gain applied by the audio signal processing module,
   an echo path gain estimated at the first user terminal,
   a gain in each of a plurality of processing stages associated with processing the audio signal, and
   the indication of gain applied at the least one further user terminal.

9. A method according to claim 7, further comprising comparing the estimated system gain to a threshold and reducing the system gain if it is determined that the estimated system gain exceeds said threshold.

10. A method according to claim 1, wherein reducing the system gain further comprises altering a digital gain applied to the audio signal.

11. A method according to claim 1, wherein reducing the system gain further comprises altering a digital gain applied to the near-end audio signal.

12. A method according to claim 1, wherein reducing the system gain further comprises altering a digital gain applied in reducing noise associated with the near-end audio signal.

13. A method according to claim 1, wherein reducing the system gain further comprises altering a digital gain applied in suppressing echo included in the near-end audio signal resulting from said outputted processed audio signal.

14. A method according to claim 1, the method further comprising estimating the gain applied by the audio signal processing module based on a ratio of the noise level estimates.

15. A method according to claim 1, wherein estimating the gain applied by the audio signal processing module further comprises using portions of the audio signal having an energy which does not exceed a threshold amount above the estimated noise level associated with the audio signal.

16. A method according to claim 1, wherein the near-end audio signal comprises speech of a user associated with the first user terminal for transmission from the first user terminal in a communication event.

17. A method according to claim 16, wherein the communication event comprises a voice-over-internet-protocol (VoIP) call, and wherein the outputted processed audio signal comprises far-end speech signals of the VoIP call.

18. A user terminal comprising:
   a network interface configured to receive an audio signal from at least one further user terminal over a communications network; and
   a processing unit for executing a communication client application, the communication client application configured, responsive to execution by said processing unit, to:
      supply the audio signal to an audio signal processing module, wherein the audio signal processing module is configured to:
         process the audio signal thereby applying a level of gain to the audio signal; and
         output a processed audio signal to an audio output mechanism associated with the user terminal;
      estimate a noise level associated with the audio signal and a noise level associated with the processed audio signal, wherein to estimate the noise level associated with the audio signal and the noise level associated with the processed audio signal comprises estimating the noise levels during one or more periods of silence of speech in the audio signal or processed audio signal;
      estimate the gain applied by the audio signal processing module based, at least in part, on both the noise level estimates;
      selectively reduce a system gain associated with at least one of the audio signal and a near-end audio signal received via an audio input mechanism associated with the user terminal, based on at least at the estimated gain applied by the audio signal processing module.

19. The user terminal of claim 18, wherein the audio output mechanism comprises a speaker configured to output the outputted audio signal, and wherein the audio input mechanism comprises a microphone configured to receive the received audio signal.

20. A computer program product configured to reduce noise in an acoustic system comprising a first user terminal and at least one further user terminal, the computer program product being embodied on at least one computer-readable storage memory device and configured, responsive to execution by at least one processor of the first user terminal, to:
   supply a received audio signal to an audio signal processing module associated with the first user terminal, wherein the audio signal processing module processes the audio signal, whereby a level of gain is applied to the audio signal, and outputs a processed audio signal to a speaker associated with the first user terminal;

estimate a noise level associated with the audio signal and a noise level associated with the processed audio signal, wherein to estimate the noise level associated with the audio signal and the noise level associated with the processed audio signal comprises estimating the noise levels during one or more periods of silence of speech in the audio signal or processed audio signal;

estimate the gain applied by the audio signal processing module based, at least in part, on both the noise level estimates; and selectively altering a digital gain applied in suppressing echo included in a near-end audio signal received via a microphone associated with the user terminal resulting from said outputted processed audio signal, based on at least the estimated gain applied by the audio signal processing module.

* * * * *